(12) United States Patent
Otaka et al.

(10) Patent No.: US 11,503,528 B2
(45) Date of Patent: Nov. 15, 2022

(54) BASE STATION, TERMINAL DEVICE, CONTROL METHOD, AND PROGRAM FOR HANDOVER CONNECTIONS

(71) Applicant: Honda Motor Co., Ltd., Tokyo (JP)

(72) Inventors: Masaru Otaka, Wako (JP); Kosei Tsushima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 17/173,073

(22) Filed: Feb. 10, 2021

(65) Prior Publication Data

US 2021/0176689 A1 Jun. 10, 2021

Related U.S. Application Data

(63) Continuation of application No. PCT/JP2019/014310, filed on Mar. 29, 2019.

(51) Int. Cl.
| | |
|---|---|
| H04W 4/00 | (2018.01) |
| H04W 36/30 | (2009.01) |
| H04W 76/27 | (2018.01) |
| H04W 36/00 | (2009.01) |
| H04W 80/02 | (2009.01) |

(52) U.S. Cl.
CPC ....... *H04W 36/30* (2013.01); *H04W 36/0058* (2018.08); *H04W 36/00835* (2018.08); *H04W 36/00837* (2018.08); *H04W 76/27* (2018.02); *H04W 80/02* (2013.01)

(58) Field of Classification Search
None
See application file for complete search history.

(56) References Cited

U.S. PATENT DOCUMENTS

| | | | | |
|---|---|---|---|---|
| 2007/0147337 A1* | 6/2007 | Bosch | .................. | H04B 7/2681 370/350 |
| 2017/0311208 A1* | 10/2017 | Yu | ..................... | H04W 36/0069 |
| 2019/0021036 A1 | 1/2019 | Shimizu et al. | | |

FOREIGN PATENT DOCUMENTS

| | | |
|---|---|---|
| JP | 2012049960 A | 3/2012 |
| JP | 2017175317 A | 9/2017 |
| JP | 2017216663 A | 12/2017 |

OTHER PUBLICATIONS

International Search Report of related international application PCT/JP2019/014310, dated May 28, 2019.
English Translation of International Search Report of related international application PCT/JP2019/014310, dated May 28, 2019.
(Continued)

*Primary Examiner* — Suhail Khan
(74) *Attorney, Agent, or Firm* — Suzanne Gagnon; American Honda Motor Co., Inc.

(57) ABSTRACT

A base station, a terminal device, a control method, and a program for communication handover are provided. First information indicating one or more base stations which are candidates for a handover destination of a terminal device in connection from a base station, is acquired. Second information regarding communication quality predicted in a communication through a candidate base station for each of the candidate base stations is acquired based on the first information. Third information regarding the communication quality for at least one of the candidate base stations is notified to the terminal device based on the second information. The third information is used to handover of the terminal device.

22 Claims, 9 Drawing Sheets

(56) References Cited

OTHER PUBLICATIONS

Written Opinion of the International Searching Authority of related international application PCT/JP2019/014310, dated May 28, 2019.
European Search Report of EP application No. 19922574, dated Jun. 7, 2022.

* cited by examiner

| Communication quality information (2 bits) | Description (for remote driving) |
|---|---|
| 00 | Enable remote driving to be executed with high accuracy |
| 01 | Enable remote driving to be executed with low accuracy |
| 10 | Disable remote driving to be executed |
| 11 | No effective communication quality information |

FIG. 8

BASE STATION, TERMINAL DEVICE, CONTROL METHOD, AND PROGRAM FOR HANDOVER CONNECTIONS

CROSS-REFERENCE TO RELATED APPLICATION

This application is a continuation of International Patent Application No. PCT/JP2019/014310 filed on Mar. 29, 2019, the entire disclosure of which is incorporated herein by reference.

FIELD

The present disclosure relates to a technology for handover connections.

BACKGROUND

An operator at a remote location may operate and move a vehicle through remote driving technologies. In remote driving, communication quality such as communication delay between an operator device operated by an operator who performs the remote driving and a terminal device mounted on a vehicle should be considered.

A cellular wireless communication network with an expanded communication area may be used for communication for performing vehicle traveling control such as remote driving. Since the terminal device mounted in the vehicle moves with the movement of the vehicle, it may be difficult to continuously maintain the connection with one base station. Thus, the terminal device operates to execute a handover process for switching the connection from one base station to another base station to maintain a connection with the network (and a connection with an operator device).

SUMMARY

Even when the communication delay via the base station that the terminal device is currently connected may be sufficiently small, the terminal device may be handed over to another base station of insufficient communication quality as the communication delay is increased beyond what is desirable.

In one aspect, the present disclosure provides a technique for a communication device to perform a handover to a base station capable of obtaining sufficient communication quality.

According to an aspect of the present disclosure, a communication device may be handed over to a base station capable of obtaining sufficient communication quality.

According to an aspect of the present disclosure, a base station is provided that comprises a memory storing instructions that when executed by a processor causes the processor to: acquire first information indicating one or more other base stations, which are candidates for a handover destination of a terminal device currently in connection with the base station; acquire second information regarding communication quality predicted in a communication through a candidate base station for each of the candidate base stations based on the first information; and notify the terminal device of third information regarding the communication quality for at least one of the candidate base stations based on the second information; wherein the third information is used to handover the terminal device to one of the candidate base stations.

According to an aspect of the present disclosure, a terminal device is provided that comprises a communication circuit; and a memory storing instructions when executed by a processor causes the processor to: acquire from a first base station connected for communication through the communication circuit, for at least one of one or more other base stations, which are candidates for a handover destination of the terminal device, information regarding communication quality predicted in a communication through the one or more candidate base stations; and notify the first base station of information for executing a handover based on the information regarding communication quality.

According to an embodiment, a computer-implemented handover method that is executed by a first base station is provided, the method comprises acquiring first information indicating one or more other base stations, which are candidates for a handover destination of a terminal device currently connected to the first base station; acquiring second information regarding a communication quality predicted in a communication through a candidate base station for each of the one or more candidate base stations based on the first information; and notifying the terminal device of third information regarding the communication quality for at least one of the one or more candidate base stations based on the second information; wherein the third information is used to handover the terminal device to one of the candidate base stations.

According to an embodiment, a computer-implemented handover method that is executed by a terminal device is provided, the method comprising acquiring, from a first base station currently connected to the terminal device, for at least one of one or more other base stations, which are candidates for a handover destination of the terminal device, information regarding communication quality predicted in a communication through the one or more candidate base stations; and notifying the first base station of information for executing a handover based on the information regarding communication quality.

Other features and advantages of the present disclosure will become apparent from the following description with reference to the accompanying drawings. Note that, in the accompanying drawings, the same reference numerals are denoted to the same or similar configurations.

BRIEF DESCRIPTION OF THE DRAWINGS

The accompanying drawings are included in the specification and constitute a part thereof, and illustrate embodiments of the present disclosure and are used to explain the principles of the present disclosure, together with the description.

FIG. 8 is a view illustrating one aspect of communication quality information in accordance with the present disclosure.

DESCRIPTION

Figure 1:
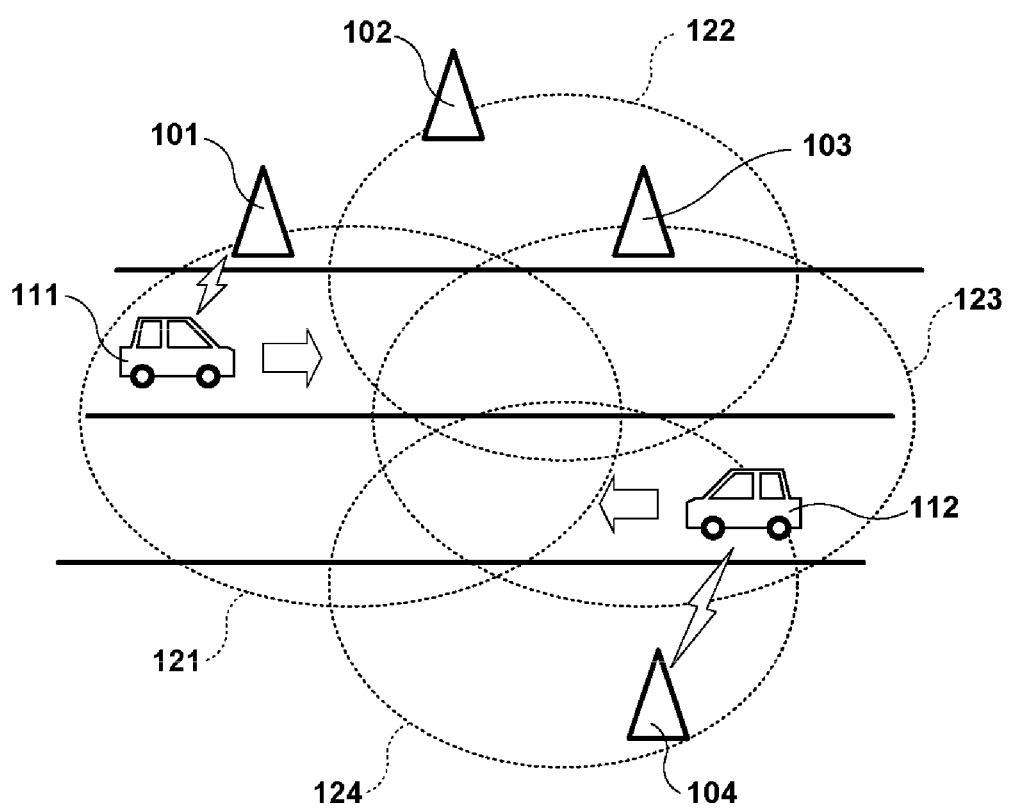
FIG. 1 is a view illustrating an exemplary system configuration in accordance with one aspect of the present disclosure.

Embodiments are described in detail below with reference to the accompanying drawings. Note that the following embodiments are not intended to limit the disclosure according to the claims, and all of the combinations of the features described in the embodiments may not be essential to the disclosure. Two or more features of the plurality of features described in the embodiments may be arbitrarily combined. Furthermore, the same reference numerals denote the same or similar configurations, and redundant descriptions thereof are omitted.

FIG. 1 illustrates an exemplary configuration of a communication system according to the present disclosure. The communication system is, for example, a cellular wireless communication system, and is configured to include base stations 101, 102, 103 and 104 and terminal devices 111 and 112. The base stations 101 to 104 respectively form cells 121, 122, 123 and 124, and a base station connects to a terminal device in a cell formed by the base station to perform wireless communication. Note that the terminal device connects to any of the base stations forming the cell that covers the position of that device to perform wireless communication. That is, the cell may be disposed so as to overlap with other cells in at least a part of the cell, and the terminal device connects to the base station forming any of the cells in the overlapping area.

In one example, the base station 101 to 104 and the terminal device 111 to 112 may be a base station (gNodeB) and a terminal of a fifth generation (5G) cellular communication system, but are not limited to such and may be a base station and a terminal corresponding to LTE (long term evolution) or other generation cellular communication standards. Furthermore, the base station 101 to 104 may be a base station directly connected to the core network, or may be a relay station wirelessly connected to another base station. Moreover, the cellular wireless communication system is an illustrative example, and it is understood that a radio communication system of a scheme other than cellular such as a wireless LAN communication system, may be used. For example, in the following description, in a case where wireless LAN is used, the base station may be read as an access point, and the terminal device may be read as a station.

In the present embodiment, the terminal device mounted on a vehicle performs wireless communication to perform traveling control of the vehicle, such as remote driving. However, this is merely an example, and an arbitrary terminal device having a wireless function of being able to connect to a cellular communication network such as a smart phone, a mobile phone, a personal computer, and the like may be used. Furthermore, an example in which one base station forms one cell is shown, but generally, one base station may form a plurality of cells.

In the example of FIG. 1, the terminal device 111 exists within a range of the cell 121 formed by the base station 101, and connects to the base station 101 to perform wireless communication. The terminal device 112 exists within a range of the cell 124 formed by the base station 104, and connects to the base station 104 to perform wireless communication. Although the position of the terminal device 112 is also within the range of the cell 123 formed by the base station 103, the terminal device 112 may connect to the base station 104 due to reasons such as, for example, the wireless or radio quality of the radio signal from the base station 104 being higher than the radio quality of the radio signal from the base station 103.

Note that in the example of FIG. 1, an example is illustrated in which the terminal device is connected to one base station, but the terminal device may be connected to a plurality of base stations. For example, the terminal device may be connected to an LTE base station and may be connected to a 5G base station. The terminal device may communicate user data with the 5G base station while performing control communication (and communication of user data as necessary) with the LTE base station. In the following, a case where the terminal device performs a handover is described, but the handover here also includes a procedure for switching a connection among a plurality of 5G base stations, provided that the terminal device is capable of establishing a connection with the LTE base station. In this case, in the following discussion, the procedure described as communication between the base station of the handover source and the terminal device may be replaced with communication between the LTE base station and the terminal device. In other words, when the terminal device is connected in parallel with the plurality of base stations and control communication can be performed with the base station in which a connection is maintained, communication need not be performed between the base station in which the connection is switched and the terminal device.

In the present embodiment, the radio quality may be used as the communication quality and as a selection criteria of the base station to which the terminal device is connected. In place or in addition to the radio quality, a communication delay with a communication opposing device such as an operator device (not illustrated) operated by an operator of remote driving may be used as the communication quality and as the selection criteria. Note that the communication delay serving as a communication quality is an example, and other values such as the required signal processing level, the modulation scheme to be used, and the like may be used as the communication quality. In these cases, for example, the terminal device compares the capability of the terminal device itself with the information notified as the communication quality, and selects a base station corresponding to the level of signal processing that can be executed by the terminal device itself and the modulation scheme capable of being used by the terminal device itself as the base station to which the terminal device is connected. Information regarding radio quality in past communications, such as variance and average value of the radio quality in the past communications may also be used as the communication quality. In other words, in addition to the radio quality measured by the base station and the terminal device, the past radio quality may be selected as a selection criteria of the base station to which the connection is made.

In the present embodiment, a handover procedure of the terminal device is executed so that the terminal device connects to a base station that can provide communication in a path capable of sufficiently reducing the communication delay. To this end, the base station according to the present embodiment acquires first information indicating one or more other base stations (hereinafter referred to as candidate base stations) that are candidates for the handover destination of the terminal device from each of the one or more terminal devices in connection with the base station. The base station acquires, for the one or more candidate base stations indicated by the acquired first information, second information regarding communication quality including a communication delay predicted in the communication when assuming the terminal device connects to the candidate base station and communicates with the opposing device. Then, the base station transmits to or notifies the terminal device of third information regarding the communication quality for at least one of the candidate base stations based on the acquired second information.

Meanwhile, the terminal device transmits to or notifies the base station in connection with the terminal device of the first information indicating the one or more candidate base stations. Then, the terminal device receives, from the connected base station, the third information regarding communication quality for at least one of the one or more candidate base stations. Rather than the base station providing information on all adjacent cells to the terminal device, the base station merely needs to provide only the information on another base station that may be the handover destination of the terminal device, and thus the amount of information provided can be reduced. Furthermore, by reducing the amount of information, the base station can provide the required information to the terminal device in a short time.

The base station and the terminal device execute a handover control of the terminal device using the third information. In an illustrative example, the terminal device measures the radio quality for each of the candidate base stations, and in a case where the radio quality satisfies a predetermined condition (e.g., when a difference between the radio quality of the connected base station and the radio quality of any of the candidate base stations is greater than or equal to a predetermined level), the terminal device transmits a measurement report including information of a candidate base station, in which the radio quality satisfies the predetermined condition, to the connected base station. The terminal device of the present embodiment may use this mechanism to not transmit the measurement report for candidate base stations in which the communication delay exceeds the magnitude of the acceptable communication delay of the terminal device (hereinafter sometimes referred to as request delay). In a case where the radio quality for the candidate base station, in which the communication delay is smaller than the request delay, satisfies a predetermined condition, the terminal device transmits a measurement report including the information of the relevant candidate base station to the connected base station. In an illustrative example, the measurement report transmitted by the terminal device does not include the information of the candidate base station that does not satisfy the request delay, and thus the terminal device can avoid being handed over to the unsuitable candidate base station.

In some aspects, the terminal device may attribute a value to the radio quality of the candidate base station having a greater communication delay than the request delay with a value that is lower than the measured value. In other words, the terminal device may handle the radio quality of the candidate base station having a greater communication delay than the request delay as a radio quality lower than the actual measurement result by subtracting a predetermined offset value from the measurement value. Therefore, the probability that the radio quality satisfies a predetermined condition can be reduced for a candidate base station having a large communication delay, and the terminal device can further avoid being handed over to the unsatisfactory candidate base station. Furthermore, the terminal device may attribute a value to the radio quality of the candidate base station having a smaller communication delay than the request delay with a value that is higher than the measured radio quality. In other words, the terminal device may handle the radio quality of the candidate base station having a smaller communication delay than the request delay as a radio quality higher than the actual measurement result by adding a predetermined offset value to the measurement value. Therefore, the probability that the radio quality satisfies a predetermined condition can be enhanced for a candidate base station having a small communication delay, and the terminal device can be promoted to perform the handover to that candidate base station.

Note that the base station in connection with the terminal device may obtain the first information by, for example, a message (e.g., measurement report (MR)) reporting a result of the terminal device measuring the radio quality of detected radio signals from surrounding base stations (cells). That is, the terminal device transmits the MR when a predetermined event occurs such as, for example, when the radio quality of the cell adjacent to the servicing cell exceeds a predetermined threshold value, and the connected base station may specify the surrounding base stations in the MR as the candidate base stations. Thus, the known MR can be used as is, and hence the signaling overhead can be prevented from increasing. Furthermore, the base station in connection with the terminal device may collect the second information from the candidate base station using, for example, an X2 interface or an S1 interface. In this way, the base station in connection with the terminal device may collect information using an existing interface. Furthermore, the third information may be, for example, transmitted and received by a message individually transmitted for each terminal device, such as a MAC (medium access control) message or an RRC (radio resource control) message. According to this configuration, appropriate information can be provided according to the status of each terminal device, and fine control can be performed. Further, the connected base station may provide to the terminal device only information on the candidate base stations around the terminal device for each terminal device, and thus can reduce the amount of transmission information, and can notify each terminal device of the necessary information at a high speed.

Note that, for example, fora candidate base station in which the communication delay is greater than a predetermined value, the base station connected to the terminal device may not notify the terminal device of the information on the communication delay. In this case, the terminal device may determine that the communication delay is very large for a candidate base station in which communication delay information has not been provided, and may perform a control so that the handover to the candidate base station is not performed. The predetermined value may, for example, be defined according to a terminal category or a communication application. For example, for a terminal device that only performs communication for an application in which a large communication delay is acceptable, the predetermined value may be set to a large value. Furthermore, for a terminal device that performs communication of an application that requires real-time characteristics such as remote driving, for example, the predetermined value may be set to a small value. According to this configuration, the amount of information notified to the terminal device is reduced, and thus provision of information to the terminal device can be completed at high speed.

In an illustrative example, the magnitude of the communication delay in each base station may be obtained by collecting information indicating the communication delay actually measured when another terminal device was connected and communicated to the relevant base station in the past. A base station notifies the collected information regarding the magnitude of the communication delay to other base stations that form cells in an adjacent relationship with the cell formed by the base station. Each base station may use the information related to the magnitude of the communication delay acquired from other base stations for handover control as described above.

The information on the magnitude of the communication delay may be information indicating, in one example, a predicted communication delay amount, which is predicted based on an actually measured value of the communication delay. The information regarding the magnitude of the communication delay may be, for example, information indicating a statistical value, such as an average value, standard deviation, mode value, or the like, of the actual value of the past communication delay, or the maximum value of the past communication delay. Note that the information regarding the magnitude of the communication delay may indicate a value obtained by multiplying the maximum value of the past communication delay by a predetermined multiplier, or may indicate a predetermined value when the maximum value exceeds a predetermined value. That is, the information regarding the magnitude of the communication delay may be information indicating a value based on the maximum value of the past communication delay. The information regarding the magnitude of the communication delay may be information indicating a value in which the influence of the value of the actually measured communication delay close to the present is strengthened, and the influence of the value of the actually measured communication delay is reduced as it goes back in the past. For example, a weighted average value, obtained by multiplying a large number of actually measured values by a coefficient that becomes smaller as the time difference between the time when the actually measured values are acquired and the current time becomes larger, may be used as the information regarding the magnitude of the communication delay. Furthermore, the actually measured communication delay may be classified by, for example, days of the week, time of day, and the like. This is because, for example, the number of vehicles using vehicle traveling control technology that utilizes communication, such as remote driving, varies greatly and the magnitude of the communication delay may vary greatly between days of the week and time zones in which congestion tends to easily occur, and the other days of the week and time zones. In this case, the base station may determine the information regarding the magnitude of the communication delay to be used, depending on which other attributes (presence or absence of an event, etc.) contributing to the magnitude of the communication delay such as the days of the week, the time zone or the traffic jam the current state of the base station (and other base stations around it) belongs to.

Note that, for example, the information regarding the magnitude of the communication delay may be information indicating that the actually measured communication delay belongs to one of a plurality of stages such as (1) small enough to enable the remote driving to be executed with high accuracy; (2) large enough to enable the remote driving to be executed but with a relatively lower accuracy; (3) large enough to disable the remote driving to be executed, and (4) no effective information regarding the communication delay. In this case, each base station may notify other base stations of two bits of information indicating, for example, to which one of (1) to (4) described above it belongs, for example, depending on the magnitude of the actually measured communication delay. In this way, the information of the actually measured communication delay can be notified with sufficient accuracy for use in a predetermined application with a small number of bits. This is an example, and information may be indicated in ranks other than the four stages. The notified information may also include a numerical value directly indicating the actually measured communication delay. Therefore, it is possible to determine in detail with how much communication delay the communication can be performed, when the base station that has acquired the information may connect the terminal device to each of the other base stations in an adjacent relationship. In this way, the information on the actually measured communication delay can be transmitted and received in an arbitrary form.

Furthermore, the communication delay information includes, not only the propagation delay related to the time in which the signal is propagated (cable or air section) between two devices forming a direct link, but also the processing time related to modulation/demodulation of signals for communication of each device associated with communication on a communication path, coding, decoding of cryptograph, and the like. For example, a total time until the signal reaches the opposing device when a signal is transmitted from a terminal device, and a total time until the signal reaches the terminal device when a signal is transmitted from the opposing device to the terminal device, may be referred to as a communication delay. Note that the communication delay may be, for example, a delay in a direct link between the terminal device and the base station, for example. Furthermore, the communication delay may be, for example, a communication delay between the gateway that is a barrier between the networks and the terminal device, when the opposing device belongs to a network external to the cellular communication network. That is, the communication delay refers to a delay in any of some or all of the communication paths, unless specifically stated otherwise, and is not limited to any of these.

In the following, the configuration of the base station and the terminal device that execute the processes described above and some examples of the operations thereof will be described below.

Figure 2:
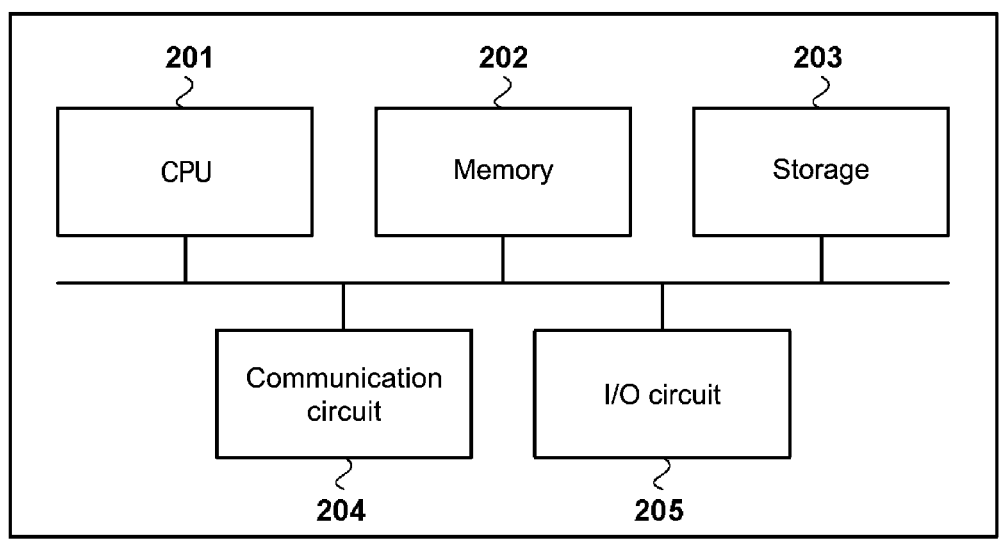
FIG. 2 is a view illustrating an exemplary hardware configuration of a base station and a terminal device in accordance with one aspect of the present disclosure.

FIG. 2 illustrates an example of a hardware configuration of a base station and a terminal device according to an exemplary embodiment. The base station and the terminal device are communication devices including a general purpose computer in one example, and include, for example, a CPU 201, a memory 202, a storage 203, a communication circuit 204, and an input/output circuit 205. The CPU 201 executes, for example, a program stored in the memory 202 to perform processes described below and control of the device. Note that the CPU 201 may be replaced by any one or more processors, such as an MPU or an ASIC. The memory 202 holds a program for causing the base station and the terminal device to execute various processes, and also functions as a working memory during program execution. The memory 202 is, in one example, RAM (random access memory) and ROM (read-only memory). The storage 203 is, for example, a removable external storage, a built-in hard disk drive, or the like, and holds various types of information.

The communication circuit 204 performs signal processing related to communication, acquires various information from the external device through the communication network, and transmits the various information to an external device. Note that the information acquired by the communication circuit 204 may be stored, for example, in the memory 202 and the storage 203. Note that the base station and the terminal device may include a plurality of communication circuits 204. For example, the base station may include a communication circuit for wired communication that can be used for communication with other base stations, and a communication circuit for wireless communication with the terminal device. The base station may, in one example, establish an X2 interface and directly communicate with the other base stations, or may communicate with the other base stations via the core network using an S1 interface. Furthermore, the base station may establish radio links and perform communication with other devices for connection with other base stations and core networks. Moreover, the wireless connection between the base station and the terminal device is performed according to a cellular communication standard such as 5G or LTE. The base station and the terminal device may include a communication circuit for communicating with each of the supported communication standards. Furthermore, the terminal device may include a communication circuit for performing wireless communication according to standards related to, for example, wireless LAN and other wireless communication schemes other than cellular communication standards.

The input/output circuit 205 controls, for example, output of image information to be displayed on a display device (not illustrated) and audio information to be output from a speaker, and acceptance of user input through a keyboard, a pointing device, or the like. Note that the input/output circuit 205 may control a device that performs input/output integrally such as a touch panel. The configuration of FIG. 2 is an example, and for example, a base station and a terminal device may be configured by dedicated hardware to perform the processes described above.

Figure 3:
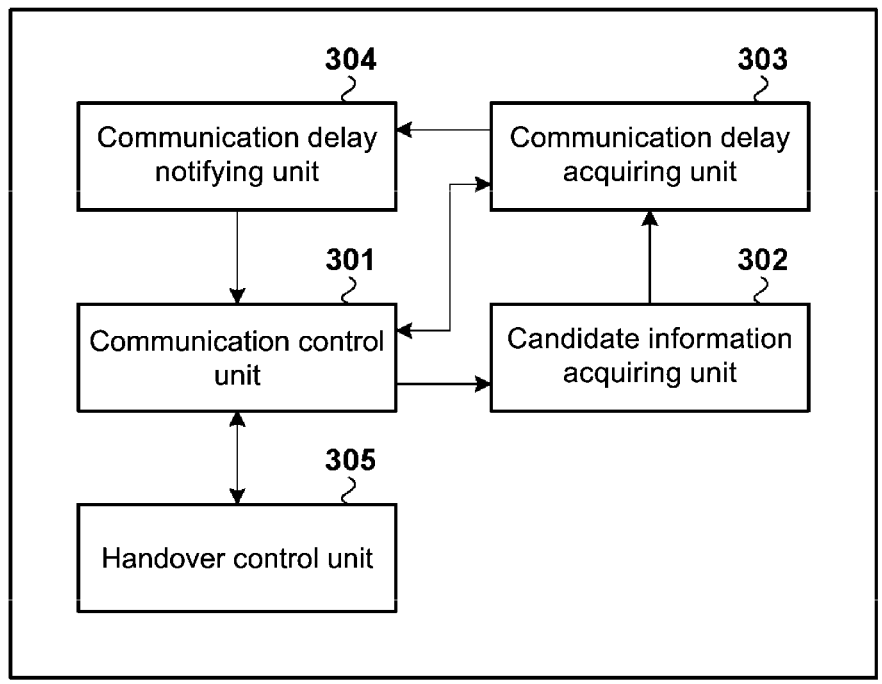
FIG. 3 is a view illustrating an exemplary configuration of a base station in accordance with one aspect of the present disclosure.

FIG. 3 illustrates an example of a configuration of a base station according to the present embodiment. The base station is a base station capable of wirelessly communicating with a terminal device in accordance with a cellular communication standard. The base station includes, for example, a communication control unit 301, a candidate information acquiring unit 302, a communication delay acquiring unit 303, a communication delay notifying unit 304, and a handover control unit 305.

The communication control unit 301 performs execution control of the communication by the base station. For example, the communication control unit 301 controls the communication circuit 204 to establish a radio link with the terminal device and perform wireless communication. The communication control unit 301 also controls the communication circuit 204 to establish the X2 interface or to use the S1 interface to communicate with other base stations in an adjacent relationship through the core network. Note that the other base stations in adjacent relationship are other base stations that form cells included in the cells formed by the base station and that form cells adjacent to the cells formed by the base station. However, the base station may communicate with other base stations that are not actually in an adjacent relationship but form cells around the cells formed by the base station itself, or with other base stations in which the distance between base stations is less than or equal to a predetermined distance.

The candidate information acquiring unit 302 acquires the information of the other base stations (candidate base stations) that may be candidates for the handover destination. Note that the candidate information acquiring unit 302 may specify the candidate base station in accordance with, for example, the position of the terminal device and the movement schedule path. In other words, the candidate information acquiring unit 302 merely needs to be able to acquire any information that can specify the candidate base station for each connected terminal device as information indicating the candidate base station, and need not acquire information that directly indicates the candidate base station. For example, the candidate information acquiring unit 302 may acquire information of the movement schedule path of the terminal device from the communication opposing device of the terminal device. In other words, the candidate information acquiring unit 302 may acquire information that can specify the candidate base station from a device other than the terminal device.

The communication delay acquiring unit 303 acquires, for the candidate base station specified by the candidate information acquiring unit 302, information of the predicted communication delay in the communication when it is assumed that the terminal device connects to the candidate base station and communicates with the opposing device. This communication delay is based on the magnitude of the past actually measured communication delay, as described above. Under the control of the communication control unit 301, the communication delay acquiring unit 303 acquires information on the communication delay of the candidate base station from the candidate base station or from another device holding the information on the communication delay of the candidate base station. For example, the communication delay acquiring unit 303 may acquire the information on the communication delay by transmitting a message requesting information to each candidate base station. The communication delay acquiring unit 303 may transmit a message including information (identifiers) specifying each candidate base station to a network node holding information on a communication delay of the plurality of base stations, and acquire information on the communication delay of such candidate base stations.

The communication delay notifying unit 304 notifies the terminal device of the acquired communication delay information for at least a part of the candidate base stations. The communication delay notifying unit 304 may, for example, notify the terminal device of information regarding the communication delay for all candidate base stations, and may notify the terminal device of information regarding the communication delay for the candidate base station in which the communication delay does not exceed a predetermined value. Note that the information regarding the communication delay may be information indicating the communication delay itself, or information such as whether it is sufficient to execute a predetermined application.

The handover control unit 305 executes a handover control based on the information on the communication delay.

When, for example, the terminal device measures the radio quality and reports the radio quality based on information on the communication delay described above, the handover control unit 305 may start the process for the handover of the terminal device according to such report. Note that the process for the handover executed here is the same as that used conventionally, and thus detailed descriptions thereof will be omitted.

Figure 4:
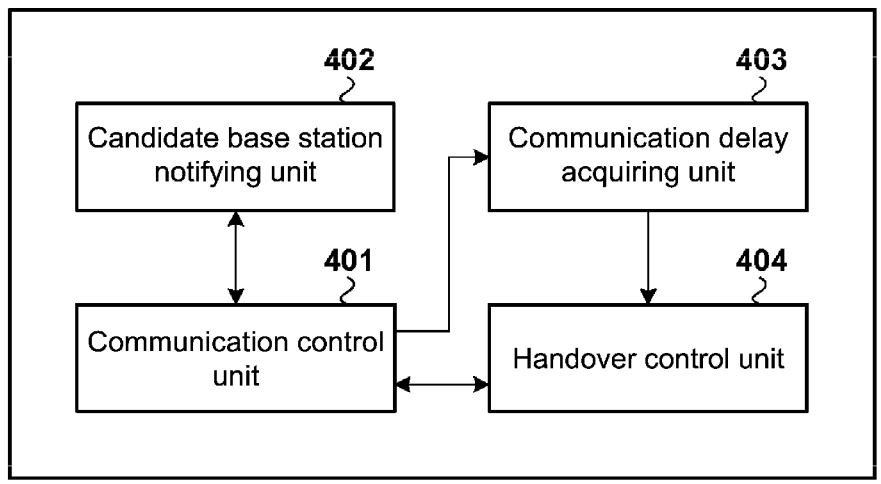
FIG. 4 is a view illustrating an exemplary configuration of a terminal device in accordance with one aspect of the present disclosure.

FIG. 4 illustrates an example of a configuration of a terminal device according to an exemplary embodiment. The terminal device includes, for example, a communication control unit 401, a candidate base station notifying unit 402, a communication delay acquiring unit 403, and a handover control unit 404. The communication control unit 401 establishes a connection with the base station and controls communication. The candidate base station notifying unit 402 notifies the connected base station of information indicating another base station (candidate base station) that is different from the connected base station, which is to become a candidate for the handover destination of the terminal device. Here, the candidate base station may be specified in cell units. In other words, for the base station forming a plurality of cells, information for each of the plurality of cells may be notified to the connected base station. The candidate base station notifying unit 402 need not notify the information that directly indicates the candidate base station, and may notify information (e.g., movement path information, etc.) that can specify the candidate base station to the connected base station. In a case where the connected base station is capable of specifying the candidate base station without acquiring information from the terminal device, such as, for example, when acquiring communication path information from a communication opposing device of the terminal device, the candidate base station notifying unit 402 may be omitted.

The communication delay acquiring unit 403 acquires information on a communication delay for each of the candidate base stations. The handover control unit 404 executes the handover control based on the information on the communication delay. For example, the handover control unit 404 may attribute a value to the measurement result of the radio quality, for a candidate base station in which the communication delay is greater than the request delay of the candidate base stations, with a value lower than the actually measured value. In addition to or in place thereof, the handover control unit 404 may attribute to the measurement result of the radio quality, for the candidate base station in which the communication delay is smaller than the request delay of the candidate base stations, a value higher than the actually measured value. Thus, a probability of the handover to a candidate base station in which a communication delay is smaller than a request delay is performed can be enhanced, and/or the handover to a candidate base station in which a communication delay is greater than a request delay is prevented from being performed or the probability thereof can be reduced.

Note that in a case where the base station currently connected to the terminal device forms a plurality of cells, the communication delay acquiring unit 403 may acquire the information on the communication delay for the plurality of cells. For example, when a handover may occur from a cell in service to another cell formed by the base station currently connected to the terminal device, the candidate base station notifying unit 402 may notify the information of the other cells to the connected base station. Then, the communication delay acquiring unit 403 may acquire, in accordance with the notification of the candidate base station notifying unit 402, information on the communication delay of the other cells formed by the connected base station. Note that in this case, even if the terminal device is moved to another cell, it is assumed that the distance from the connected base station will not vary greatly, and thus information on the base station that is currently connected need not be notified to the base station. At this time, the communication delay acquiring unit 403 may measure the communication delay in the communication executed before moving to the cell, and specify the measurement result as information on the communication delay of the other cells formed by the connected base station. Furthermore, the handover control unit 404 may enable a handover without acquiring information on the communication delay when determining that the communication delay is smaller than the request delay for the other cells formed by the connected base station.

Note that for the connected base station when the remote driving is started, for example, the communication delay is not necessarily smaller than the request delay, and hence the communication delay acquiring unit 403 may acquire the information on the communication delay of the relevant base station. For example, the communication delay acquiring unit 403 may acquire, as necessary, information on the communication delay for the connected base station by transmitting to the base station a message including a flag indicating whether or not to request for a communication delay for the cell in service. When receiving a message including a flag requesting information for a communication delay for the cell in service, the communication delay notifying unit 304 of the base station may notify not only the information on the communication delay of the candidate base station but also information on the communication delay of itself. Note that the communication delay acquiring unit 403 may always acquire information on the communication delay for the cell in service from the base station. In other words, when notifying the information on the communication delay of the candidate base station, the communication delay notifying unit 304 of the base station may also notify information on its own communication delay.

Figure 5:
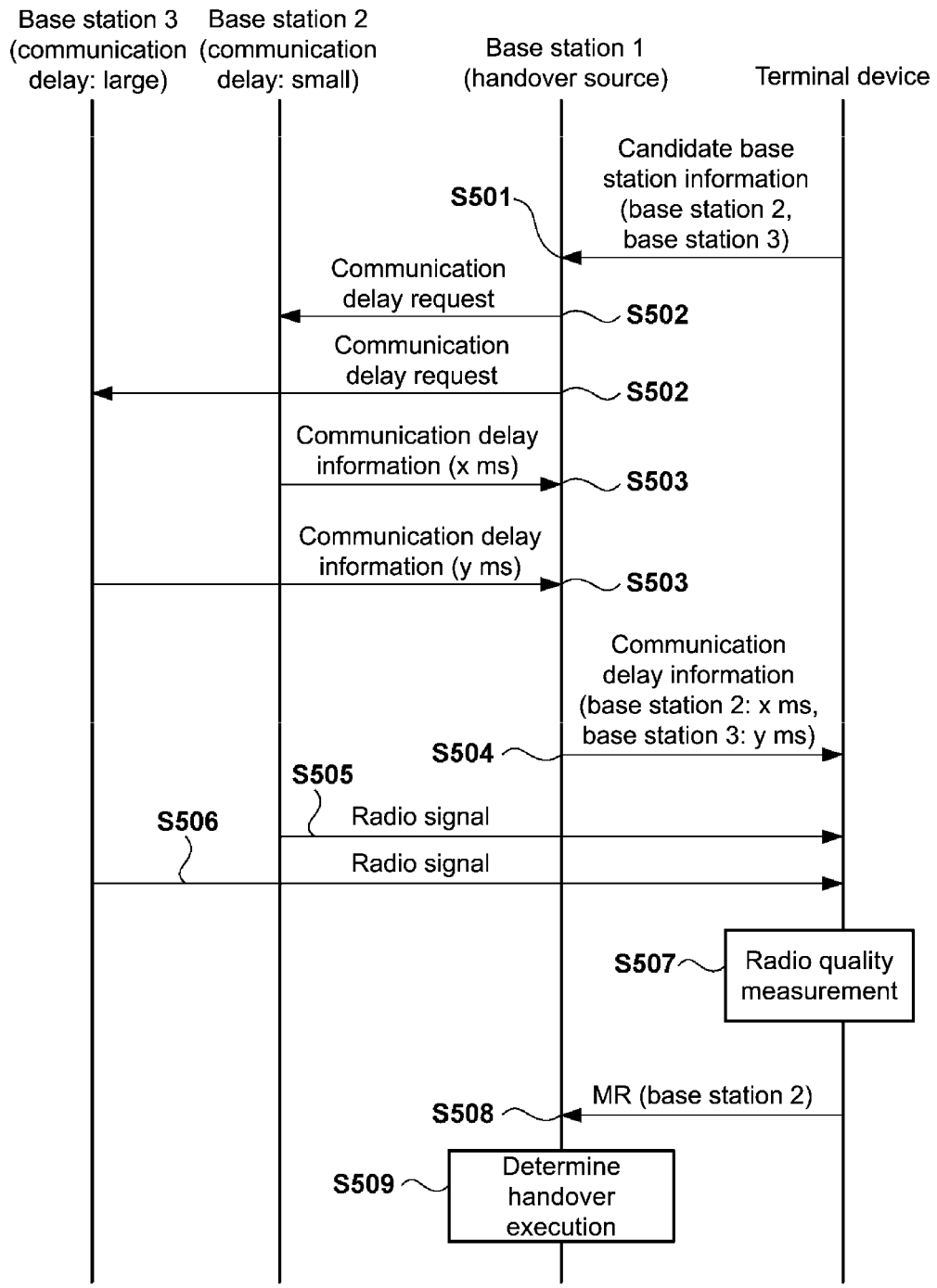
FIG. 5 is a view illustrating an exemplary process flow executed by a communication system in accordance with one aspect of the present disclosure.

Next, an example of a flow of processes in the communication system described above will be described. Referring to FIG. 5, the base station 1 is assumed to be a base station (handover source) connected to the terminal device, and a base station 2 and a base station 3 are assumed to be base stations that form a cell in an adjacent relationship with the cell formed by the base station 1.

In this process, the terminal device first notifies the candidate base station information to the connected base station 1 (S501). Here, the terminal device notifies the base station 1 of information indicating the base station 2 and the base station 3 as candidate base station information. Note that the notification is performed, for example, by reporting the measurement result of the radio quality of the surrounding base stations in the terminal device. For example, the terminal device performs the reporting to the connected base station in response to the radio quality of an adjacent cell becoming higher than a predetermined threshold value. According to the reporting, the connected base station handles a base station that forms a cell in which the radio quality exceeds a predetermined threshold as a candidate base station. Note that in the present embodiment, a "candidate base station" is referred to, but this is synonymous with "candidate cell". That is, when the candidate base station forms a plurality of cells, the base station corresponding to each of the plurality of cells is handled to be physically the same but logically different. Note that the base station 1 may not collect the candidate base station information, for example, in a case where information on the movement path of the terminal device is acquired from the communication opposing device of the terminal device.

The base station 1 transmits a message requesting information on a communication delay to each of the candidate base stations (base station 2 and base station 3) (S502), and acquires the information on the communication delay by a response message (S503). Here, the base station 1 is assumed to acquire information on a communication delay of x milliseconds as information on the communication delay of the base station 2 and of y milliseconds as information on the communication delay of the base station 3. In one example, x milliseconds a request delay of the terminal device<y milliseconds. Note that the base station 1 may acquire the information on the communication delay from each of the candidate base stations using, for example, an X2 interface, but may, for example, acquire the information on the communication delay by making a query to other devices such as other network nodes that aggregate the information on the communication delay. At this time, the base station 1 may include information specifying the opposing device in the message requesting information for the communication delay to acquire information on the communication delay between the base station 1 and the specific opposing device. Note that each base station may provide information on the communication delay periodically (e.g., every few hours, every few days, etc.) to the surrounding base stations in an adjacent relationship.

The base station 1 notifies the terminal device of the acquired information on the communication delay (S504). As an example, the base station 1 notifies the terminal device of information indicating that the communication delay of the base station 2 is x milliseconds, and the communication delay of the base station 3 is y milliseconds. Note that, as described above, the manner of notification of the communication delay is not limited thereto. For example, as described above, a communication delay of a candidate base station may be represented as steps, in a form associated with a stage of an executable process of the processes for a predetermined application (e.g., a remote driving). Furthermore, for a candidate base station in which a communication delay is large to an extent that a predetermined application cannot be executed, information on the communication delay need not be notified to the terminal device. Note that the base station 1 may notify the terminal device of the information on its own communication delay. The terminal device holds the notified information on the communication delay.

The terminal device may continuously execute (S507) the measurement of radio quality of the radio signals (S505, S506) transmitted from the surrounding base stations. Then, the terminal device transmits the measurement report (MR) capable of providing a handover trigger to the base station 1 based on the value of the measurement result and the information on the communication delay (S508). The base station 1 performs a process for executing a handover of the terminal device in response to receiving the MR (S509). For example, in response to receiving the MR including the information on the base station 2, the base station 1 transmits a handover request to the base station 2, and in response to obtaining the approval from the base station 2, transits an instruction message for switching the connection destination to the terminal device. This procedure is similar to a procedure used conventionally, and therefore will not be described in detail here.

As shown in FIG. 5, the terminal device does not transmit an MR capable of providing a handover trigger for base station 3 because of the large communication delay, even if the radio quality of the radio signal from the base station 3 is good. For example, the terminal device handles the radio quality of the base station 3 as a value obtained by subtracting a predetermined offset from the actually measured value, so that the MR that may be a handover trigger to the base station 3 is not transmitted. Meanwhile, when the radio quality of the radio signal from the base station 2 having a small communication delay is good and a predetermined condition is satisfied, the terminal device transmits an MR capable of providing a handover trigger. For example, when the radio quality of the base station 2 becomes better than the radio quality of the connected base station by a predetermined level, the terminal device transmits, to the base station 1, the MR including the information of the base station 2. Here, for the radio quality of the base station 2, the actually measured value may be used as is, or a value obtained by adding a predetermined offset to the actually measured value may be used.

According to the processes described above, the terminal device can be prevented from being handed over to a base station having a large communication delay and can move while switching the connection between the terminal device and a base station having a small communication delay.

Figure 6:
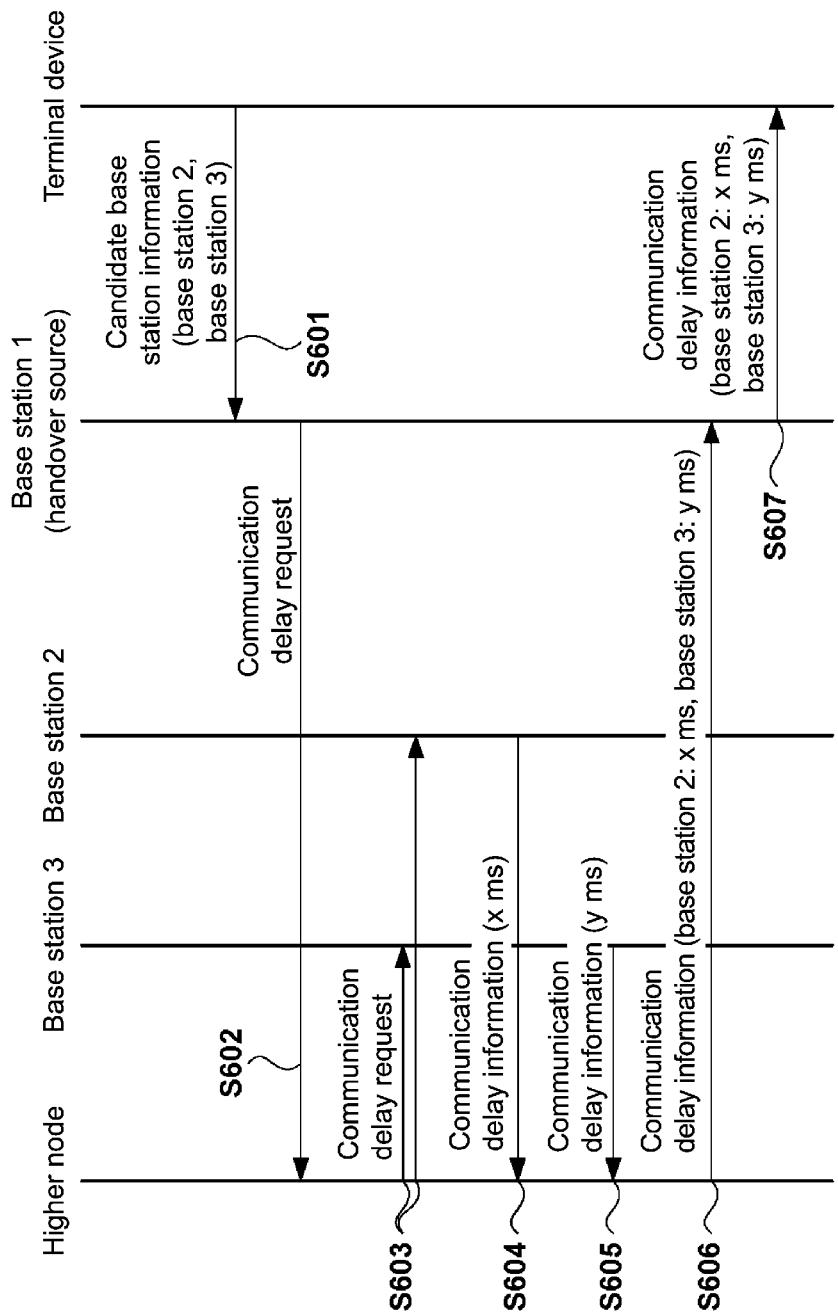
FIG. 6 is a view illustrating an exemplary process flow executed by the communication system in accordance with one aspect of the present disclosure.

Note that, in the process illustrated in FIG. 5, an example in which the base station 1 directly (e.g., using X2 interface) acquires the communication delay information from other base stations (base station 2 and base station 3) is shown, but this is not the only case. The base station 1 may acquire the communication delay information through other devices such as higher nodes, for example, using the S1 interface. An example of a flow of processes executed when acquiring the communication delay information through other devices is shown in FIG. 6. Note that the process illustrated in FIG. 6 corresponds to the processes up to S504 in FIG. 5, and the processes after S504 may be executed in the same manner as in FIG. 5.

In the process illustrated in FIG. 6, first, the base station 1 acquires candidate base station information from the terminal device, in the same manner as S501 (S601). In response to receiving the candidate base station information, the base station 1 sends a request for information on the communication delay to the higher node (S602). Note that the request may include, for example, the base station 2 and the base station 3 as destinations. In this case, the higher node transfers the request to the base station 2 and the base station 3 which are the destinations of the request (S603). Upon receiving a request for the communication delay information, the base station 2 and the base station 3 transmit, to the higher node, information on the communication delay predicted in the communication of the terminal device (S604, S605). At this time, the message transmitting the communication delay information has the base station 1 set as the destination. The higher node transfers the received communication delay information to the base station 1 (S606), and the base station 1 transmits the received communication delay information to the terminal device (S607). According to the processes described above, the base station 1 can acquire the information from other base stations, in which the X2 interface is not established, through the S1 interface.

Note that the base station 1 may transmit the request of S602 not to the higher node but to a network node that aggregates the information on the communication delay, in which case, the request may include information designating a candidate base station notified in S601. Then, the network node may generate and transmit a message requesting information on the communication delay to the base station designated by the candidate base station information in S603. The network node may acquire (S604, S605) information on the communication delay from the candidate base station as a response to the message, and transmit the acquired information collectively to the base station 1 (S606). Therefore, the device requesting information is determined as a single device, so the process can be simplified.

Note that in response to the request from the base station 1, the network node may transmit the information it has previously collected to the base station 1 without executing the processes of S603 to S605, by periodically collecting the information on the communication delay from the base station that is under its control. In this way, the communication frequency for collecting information can be reduced. Furthermore, even if a request is not received, the network node may also provide information on the communication delay to the base station under its control. In this case, the base station may extract, of the information on the communication delay received from the network node in advance, information on the communication delay for the other base station specified in the candidate base station information from the terminal device, and transmit the information to the terminal device. According to this configuration, fewer requests are transmitted to the network node in correspondence with the candidate base station information from the multiple terminal devices, and thus, the communication frequency and the communication amount in the network can be reduced.

Note that, as described above, the communication quality at each base station may be obtained by collecting information indicating the communication quality actually measured when the communication opposing device connected to and communicated with a base station in the past. According to this configuration, the terminal device can determine in advance the communication quality predicted to be obtained in the actual communication environment when connected to a base station that is a candidate for the handover destination. An example of a flow of communication quality collecting processes in such an actual environment is illustrated in FIG. 7.

Figure 7:
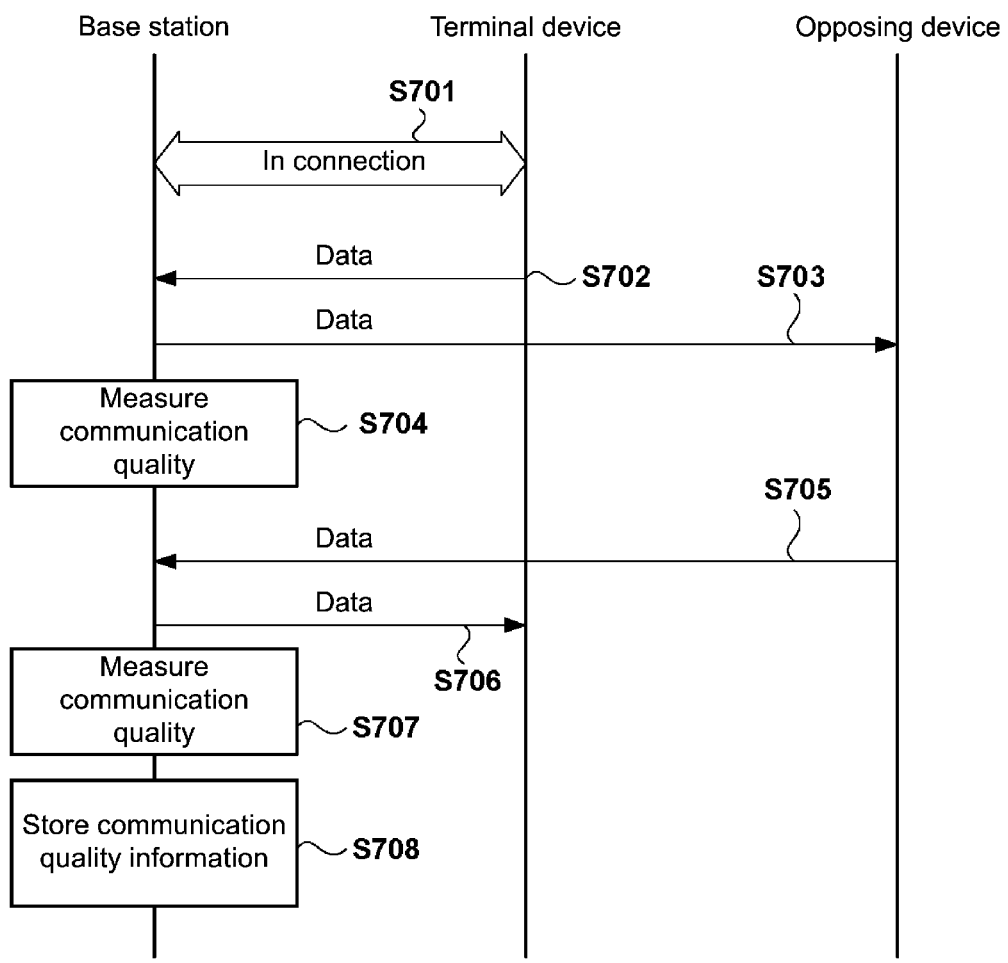
FIG. 7 is a view illustrating an exemplary process flow executed by the communication system in accordance with one aspect of the present disclosure.

In FIG. 7, the base station is in a state of establishing a connection with the terminal device (S701). In other words, the terminal device operates in a RRC connected state (RRC_Connected) and is in a state of executing data communication with the base station. At this time, when the terminal device transmits a signal to the communication opposing device (S702, S703), and when a signal is transmitted from the opposing device to the terminal device (S705, S706), the base station measures communication quality such as communication delay between the base station and the terminal device, and communication quality between the base station and the opposing device (S704, S707). The base station then stores the information on the communication quality obtained by the measurement (S708).

Note that in a case where the opposing device is a device on an external network such as the Internet, the base station may acquire information on the communication quality to a packet data network (PDN) gateway (P-GW) for connecting to an external network. In other words, the base station can recognize the relative communication quality with the opposing device by measuring the communication quality with the P-GW by assuming that the communication quality from the P-GW to the opposing device is constant even when the base station to which the terminal device connects is different. Note that the base station may acquire information on the communication delay from the P-GW to the opposing device from other devices such as the P-GW or the opposing device. In this manner, information on the communication quality may be collected as information on the communication quality in at least a part of a communication path of the communication between the terminal device and the opposing device.

Furthermore, in the notification of the communication quality information to the terminal device, as illustrated in FIGS. 5 and 6, a value directly indicating communication quality such as a value of a communication delay may be notified, or other information may be notified. For example, the base station may notify the terminal device of information indicating a degree to which the communication quality is suited to a predetermined function of the terminal device as information on communication quality. For example, when the terminal device executes a remote driving function as a predetermined function, as illustrated in FIG. 8, the communication quality and the information indicating at which level the communication quality can execute the remote driving may be notified from the base station to the terminal device.

In FIG. 8, the communication quality information when the communication quality is higher than a first predetermined value and the remote driving can be performed with high accuracy is "0 (00 in two bits)", and the communication quality information when the communication quality is lower than a second predetermined value (<first predetermined value) and the remote driving cannot be performed is "2 (10 in two bits)". Furthermore, the communication quality information when the communication quality is greater than or equal to a second predetermined value and less than or equal to a first predetermined value and the remote driving can be performed with low accuracy is "1 (01 in two bits)". Moreover, in a case where there is no effective communication quality information, the communication quality information is "3 (11 in two bits)". By using such communication quality information, the communication quality information can be notified to the terminal device simply by transmitting two bits of information.

Figure 9:
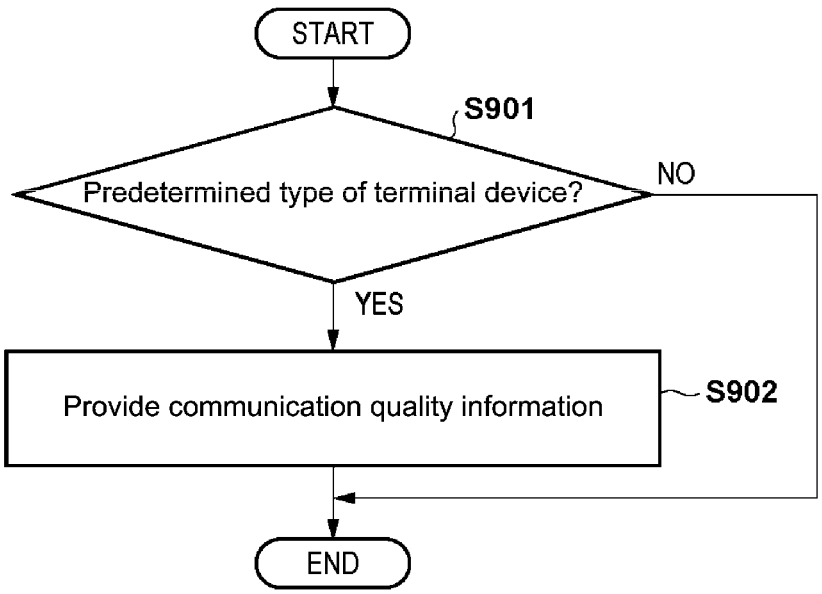
FIG. 9 is a view illustrating an exemplary process flow executed by the base station in accordance with one aspect of the present disclosure.

In a case where the terminal device is a predetermined type of terminal device, the base station notifies the communication quality information to the predetermined type of terminal device, and may not notify the communication quality information to other types of terminal device. For example, the communication quality information may be provided for a vehicle control terminal device for an automatic driving vehicle or a remote driving vehicle, and the communication quality information may not be provided to a smartphone or the like that is not a vehicle terminal device. This type of terminal device may be classified by the category of the terminal device. Furthermore, the predetermined type can be set by a network operator. An example of this flow of process is shown in FIG. 9. The base station may determine whether the type of terminal device is a predetermined type (S901), and may provide communication quality information to a predetermined type of terminal device (YES in S901, S902). Meanwhile, the base station may operate not to provide communication quality information (NO in S901) for a terminal device other than a predetermined type.

Figure 10:
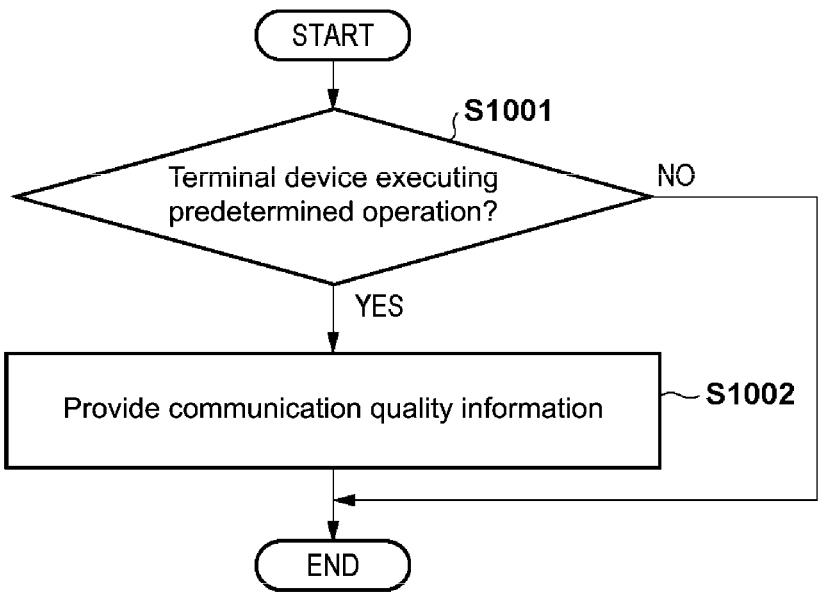
FIG. 10 is a view illustrating an exemplary process flow executed by the base station in accordance with one aspect of the present disclosure.

Furthermore, the base station may notify the communication quality information when the terminal device is executing a predetermined operation, and may not notify the information to the terminal device when it is not executing the predetermined operation. For example, information is provided to a terminal device executing a predetermined operation such as the movement speed of the terminal device being greater than or equal to a predetermined speed, or a predetermined application such as automatic driving or remote driving being executed or being prepared for execution, or the like, and information is not provided to a terminal device that is not executing such predetermined operation. Whether or not a predetermined operation is being executed may correspond to, for example, an operation mode of the terminal device. Furthermore, the predetermined operation can be set by a network operator. An example of this flow of process is shown in FIG. 10. The base station may determine whether the terminal device is executing a predetermined operation (S1001), and may provide communication quality information to the terminal device executing the predetermined operation (YES in S1001, S1002). Meanwhile, the base station may not provide communication quality information on the communication delay to a terminal device that is not executing a predetermined operation (NO in S1001).

Figure 11:
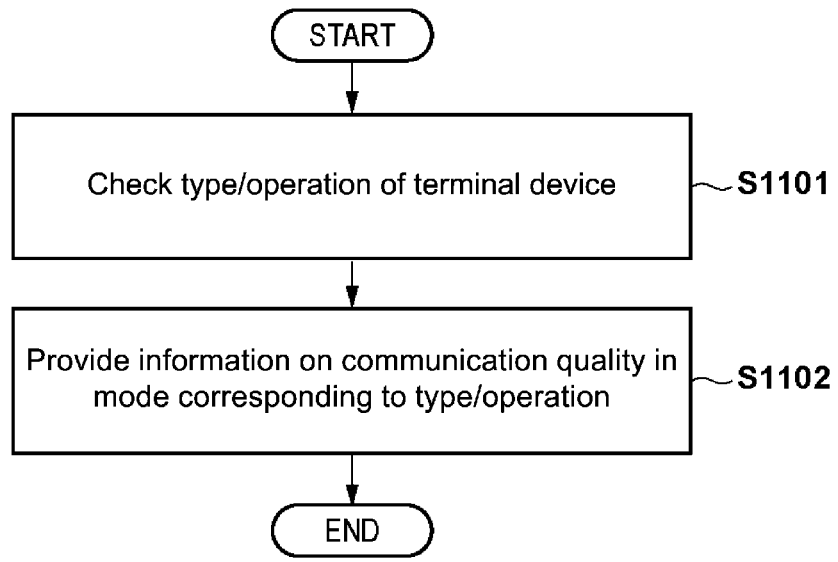
FIG. 11 is a view illustrating an exemplary process flow executed by the base station in accordance with one aspect of the present disclosure.

The base station may provide, to the terminal device, communication quality information of a predetermined mode corresponding to the type and operation of the terminal device. The flow of the process is shown in FIG. 11. The base station first checks the type/operation of the terminal device (S1101), and notifies to the terminal device of the communication quality information of a mode corresponding to such type/operation (S1102). Here, the "mode" may be a concept in which information of different modes indicates different amounts of information of the same type. For example, when the type of terminal device is a vehicle control terminal device for an automatic driving vehicle or a remote driving vehicle, the base station may provide information of a lowest quality such as the maximum value of the communication delay, and when the terminal device is an in-vehicle terminal device or a smartphone that is not used for vehicle control, the base station may provide information of an average quality such as an average value of the communication delay. Furthermore, the base station may provide information of a lowest quality to a terminal device executing a predetermined operation such as the movement speed being greater than or equal to a predetermined speed, or a predetermined application such as automatic driving or remote driving being executed or being prepared for execution, or the like, and may provide information of an average quality to a terminal device that is not executing such predetermined operation. Further, the "mode" may be a concept in which information of different modes indicates information of different types. For example, when the type of terminal device is a vehicle control terminal device for an automatic driving vehicle or a remote driving vehicle, the base station may provide information on a communication delay, and when the terminal device is an in-vehicle terminal device or a smartphone that is not used for vehicle control, the base station may provide information on a radio quality such as SIR and SINR. Similarly, the base station may provide different types of information according to the operation being executed by the terminal device. Note that the type/operation and information providing mode of the terminal device are merely illustrative examples, and other types/operations may be considered, or information of other modes may be provided.

Figure 12:
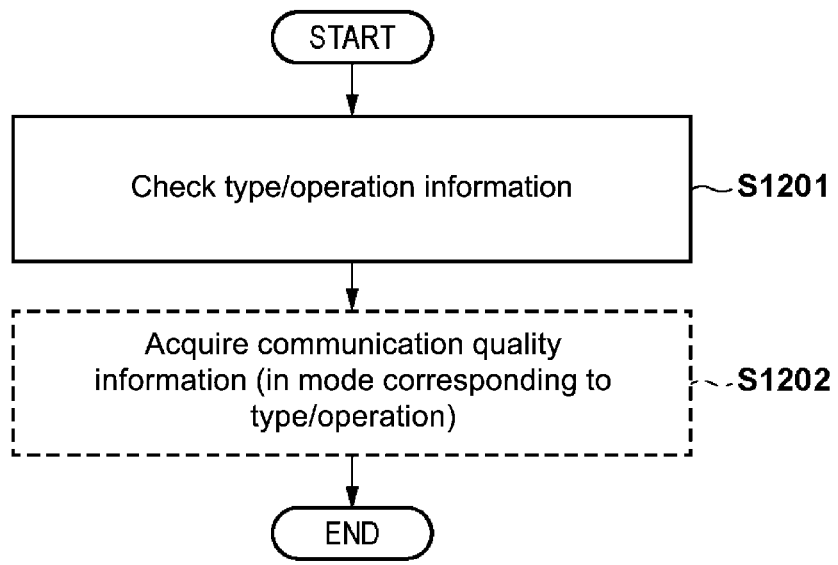
FIG. 12 is a view illustrating an exemplary process flow executed by the terminal device in accordance with one aspect of the present disclosure.

The information on the type and operation of the terminal device may, for example, be provided to the base station from the network node that manages the information of the terminal device, or may be notified by the terminal device to the base station. A flow of processes in a case where the terminal device notifies the information on the type and operation of its own device is illustrated in FIG. 12. The terminal device notifies the base station of information indicating the type and operation of the terminal device (S1201). The terminal device acquires communication quality information from the base station when, for example, the terminal device type is a predetermined type or when a predetermined operation is being executed (S1202). Note that, as described above, the base station may not provide the communication quality information in a case where the terminal device type is not a predetermined type or the predetermined operation is not being executed, in which case, the terminal device terminates the process without executing the process of S1202. Furthermore, the terminal device may acquire communication quality information in a mode corresponding to the type and operation of the terminal device. Note that the notification of the type and operation by the terminal device may be performed when the terminal device is connected to the base station. For example, since the terminal device is configured to execute processes for connecting with a base station, such as during startup, moving beyond the tracking area, and the like, information may be provided to the base station at this time. Furthermore, the terminal device may establish a connection with the base station to provide information to the base station in response to, for example, the control application such as automatic driving, remote driving, or the like being started. Note that, when the information is acquired, the base station may retain the information, or may transfer the information to a network node such as a mobility management entity (MME) to hold the information in the network node. If the network node holds such information, when the terminal device moves to an area of another base station after disconnecting the connection with the base station, the information of the terminal device can be easily handed over to the other base station.

Note that in the embodiments, description has been made that the communication quality information such as actually measured communication delay of a base station complying with the cellular communication standard is used, but it is to be understood that information on a communication quality related to other communication devices such as an access point of a wireless LAN may be used. That is, when the terminal device is assumed to be connected to an arbitrary other device capable of communicating with the supporting communication standard, information of an actually measured communication quality related to at least a portion of a communication path to a communication opposing device (operator device) may be used. Thus, the base station described above may be read as a device corresponding to a base station in other communication standards, such as an access point of a wireless LAN. Furthermore, as necessary, control such as connecting the terminal device to the access point of the wireless LAN may be executed based on actually measured quality information such as, for example, a wireless LAN. In one example, the terminal device may connect to an access point of a wireless LAN having a small actually measured communication delay under the control of the cellular base station using a scheme such as an LWA (LTE WLAN Aggregation) in which a cellular base station cooperates with an access point of a wireless LAN to provide a communication service to a terminal device.

Furthermore, the embodiments have been described focusing on the operation of the base station and the terminal device, but the present disclosure is not limited thereto. For example, network nodes other than base station may be configured to execute the functions of the base station described above. Moreover, the functional sharing between the base station and the terminal device is not limited to the description made above, and some or all of the functions of the base station may be executed by the terminal device, or some or all of the functions of the terminal device may be executed by the base station (or other network nodes).

In an embodiment, a base station comprises a memory storing instructions that when executed by a processor causes the processor to: acquire first information indicating one or more other base stations, which are candidates for a handover destination of a terminal device currently in connection with the base station; acquire second information regarding communication quality predicted in a communication through a candidate base station for each of the candidate base stations based on the first information; and notify the terminal device of third information regarding the communication quality for at least one of the candidate base stations based on the second information; wherein the third information is used to handover the terminal device to one of the candidate base stations.

According to this embodiment, the communication quality of the other base stations which are the candidates of the handover destination may be notified to the terminal device, and thus the process for causing a handover to the other base station having a sufficient communication quality to be performed can be executed. For example, the terminal device can prevent the handover from being performed to a base station with a large communication delay by reporting the radio quality for the other base station having a small communication delay, and not reporting the radio quality for the other base station having a large communication delay. The terminal device may handle the radio quality for another base station having a large communication delay as a value lower than the measured value, or may handle the radio quality for another base station having a small communication delay as a value higher than the measured value.

Optionally, the communication quality includes a communication delay.

According to the embodiment, the communication delay of the other base station of the handover candidate may be notified to the terminal device, and thus the process for causing a handover to be performed to the other base station having a small communication delay can be executed.

Optionally, the terminal device is notified of the third information by medium access control (MAC) signaling or radio resource control (RRC) signaling. According to this embodiment, the base station may perform fine control in order to perform signaling for each terminal device.

The first information optionally comprises a measurement report of a radio quality by the terminal device.

According to this embodiment, information can be collected from the terminal device by the base station without dedicated signaling for the first information. Therefore, an increase in the signaling overhead can be reduced.

Optionally, the second information is acquired from the one or more candidate base stations through an X2 interface or an S1 interface.

According to this embodiment, the base station may collect information using an existing interface.

Optionally, the second information regarding communication quality is a measured communication quality in a communication performed in the past in each of the one or more candidate base stations.

According to this embodiment, since the information on the communication quality is based on the actually measured value of the communication quality, it is possible to promote the handover of the terminal device to the base station having sufficient communication quality in the actual environment.

Optionally, the second information regarding communication quality is information on a measured communication quality in at least a portion of a communication path of a communication between the terminal device and a communication opposing device of the terminal device.

According to this embodiment, the prospect of how much communication quality can be obtained can be recognized when the terminal device communicates with a specific communication opposing device.

Optionally, the third information is information indicating a degree at which the communication quality is suited to a predetermined function of the terminal device.

According to this embodiment, with respect to a predetermined function such as remote driving, automatic driving, and the like of the terminal device, the terminal device can easily recognize whether or not the communication quality is suitable for executing the predetermined function. Furthermore, the amount of data to be communicated can be reduced by appropriately setting the number of stages of this degree than when the value of the communication quality itself is transmitted.

Optionally, the processor, operatively coupled to the memory, is configured to notify the terminal device of the third information in a case where the terminal device is a predetermined type of terminal device.

According to this embodiment, by notifying the information on the communication quality only to a predetermined type of terminal device that requires the information on the communication quality, occurrence of unnecessary communication such as providing information to a terminal device that does not require the information can be prevented.

Optionally, the processor, operatively coupled to the memory, is configured to determine whether the terminal device is executing a predetermined operation, and the terminal device is notified of the third information when the terminal device is executing the predetermined operation.

According to this embodiment, by notifying the information on the communication quality only to a terminal device performing a predetermined operation that requires the information on the communication quality, occurrence of unnecessary communication such as providing information to a terminal device that does not require the information can be prevented.

Optionally, the processor is operatively coupled to the memory and is configured to notify the terminal device of the third information of a mode corresponding to a predetermined type of the terminal device or a predetermined operation being executed by the terminal device. According to this embodiment, in a case where the characteristics of the communication quality required for each attribute of the terminal device are different, information of a mode suitable for the attribute can be provided to the terminal device.

In an embodiment, a terminal device comprises a communication circuit; and a memory storing instructions when executed by a processor causes the processor to: acquire from a first base station connected for communication through the communication circuit, for at least one of one or more other base stations, which are candidates for a handover destination of the terminal device, information regarding communication quality predicted in a communication through the one or more candidate base stations; and notify the first base station of information for executing a handover based on the information regarding communication quality.

According to this embodiment, the terminal device is able to know the communication quality of the other base stations, which are candidates of the handover destination, and thus the process for causing a handover to be performed to the other base station having a sufficient communication quality can be executed. For example, the terminal device can prevent the handover from being performed to a base station with a large communication delay by reporting the radio quality for the other base station having a small communication delay, and not reporting the radio quality for the other base station having a large communication delay. The terminal device may handle the radio quality for another base station having a large communication delay as a value lower than the measured value, or may handle the radio quality for another base station having a small communication delay as a value higher than the measured value.

Optionally, the communication quality includes a communication delay.

According to this embodiment, the terminal device is able to know the communication quality of the other base stations, which are candidates of the handover destination, and thus can execute the process for causing a handover to the other base station having a small communication delay to be performed.

Optionally, the information regarding the communication quality from the first base station is acquired by medium access control (MAC) signaling or radio resource control (RRC) signaling.

According to this embodiment, the terminal device can acquire information specific to the terminal device itself, and thus can perform a control suited to the status of the terminal device.

Optionally, the processor is operatively coupled to the memory and is configured to measure radio quality of radio signals transmitted to the terminal device from each of the candidate base stations, and transmit a measurement report to the first base station to trigger a handover of the terminal device to one of the candidate base stations.

According to this embodiment, the base station can specify the candidate of the handover destination of the terminal device without dedicated signaling. Therefore, an increase in the signaling overhead can be reduced.

Optionally, the information regarding the communication quality is based on an actually measured communication quality in a communication performed in the past in each of the one or more other base stations.

According to this embodiment, since the information on the communication quality is based on the actually measured value of the communication quality, it is possible to promote the handover of the terminal device to the base station having sufficient communication quality in the actual environment.

Optionally, the information regarding the communication quality is information indicating a degree at which the communication quality is suited to a predetermined function of the terminal device.

According to this embodiment, with respect to a predetermined function such as remote driving, automatic driving, and the like of the terminal device, the terminal device can easily recognize whether or not the communication quality is suitable for executing the predetermined function. Furthermore, the amount of data to be communicated can be reduced by appropriately setting the number of stages of this degree than when the value of the communication quality itself is transmitted.

Optionally, the information regarding the communication quality is information of a mode corresponding to a type of the terminal device or an operation being executed by the terminal device.

According to this embodiment, in a case where the value of the communication quality required for each type of the terminal device and operation being executed by the terminal device are different, the terminal device can acquire information in a mode suitable for the attribute.

Optionally, the information on the communication quality is information on a communication quality in at least a portion of a communication path of a communication between the terminal device and a communication opposing device of the terminal device.

According to this embodiment, the prospect of how much communication quality can be obtained can be recognized when the terminal device communicates with a specific communication opposing device.

Optionally, the memory storing instructions when executed by the processor causes the processor to: acquire the information on the communication quality from the base station in a case where the terminal device is a predetermined type of terminal device.

According to this embodiment, by notifying the information on the communication quality only to a predetermined type of terminal device that requires the information on the communication quality, occurrence of unnecessary communication such as providing information to a terminal device that does not require the information can be prevented.

Optionally, the memory storing instructions when executed by the processor causes the processor to acquire the information on the communication quality from the base station in a case where the terminal device is in a state of performing a predetermined operation.

According to this embodiment, by notifying the information on the communication quality only to a terminal device performing a predetermined operation that requires the information on the communication quality, occurrence of unnecessary communication such as providing information to a terminal device that does not require the information can be prevented.

Optionally, the memory storing instructions when executed by the processor causes the processor to notify the base station of information on the terminal device.

According to this embodiment, the terminal device notifies the base station that the terminal device is a terminal device of a type that requires information or is executing an operation that requires information, and acquires the necessary information from the base station.

In an embodiment a computer-implemented handover method executed by a first station is provided, the method comprising, acquiring first information indicating one or more other base stations, which are candidates for a handover destination of a terminal device currently connected to the first base station; acquiring second information regarding a communication quality predicted in a communication through a candidate base station for each of the one or more candidate base stations based on the first information; and notifying the terminal device of third information regarding the communication quality for at least one of the one or more candidate base stations based on the second information; wherein the third information is used to handover the terminal device to one of the candidate base stations.

According to this embodiment, the communication quality of the other base stations, which are the candidates of the handover destination, is notified to the terminal device, and thus the process for causing a handover to be performed to the other base station having a sufficient communication quality can be executed.

In an embodiment a computer-implemented handover method executed by a terminal device is provided, the method comprising acquiring, from a first base station currently connected to the terminal device, for at least one of one or more other base stations, which are candidates for a handover destination of the terminal device, information regarding communication quality predicted in a communication through the one or more candidate base stations; and notifying the first base station of information for executing a handover based on the information regarding communication quality.

According to this embodiment, the terminal device is able to know the communication quality of the other base stations, which are candidates of the handover destination, and thus the process for causing a handover to be performed to the other base station having a sufficient communication quality can be executed.

In an embodiment, a program is provided for causing a computer arranged in a base station to perform the functions of: acquiring first information indicating one or more other base stations, which are candidates for a handover destination of a terminal device in connection; acquiring second information regarding a communication quality predicted in a communication through the other base station for each of the one or more other base stations based on the first information; and notifying the terminal device of third information regarding the communication quality for at least one of the one or more other base stations based on the second information; where the third information is used to control a handover of the terminal device.

According to this embodiment, the communication quality of the other base stations, which are the candidates of the handover destination, is notified to the terminal device, and thus the process for causing a handover to be performed to the other base station having a sufficient communication quality can be executed.

In an embodiment, a program is provided for causing a computer arranged in a terminal device to perform the functions of: acquiring, from a base station in connection, for at least one of one or more other base stations, which are candidates for a handover destination of the terminal device, information regarding communication quality predicted in a communication through the other base station; and notifying the base station of information for executing a handover based on the information regarding the communication quality.

According to this embodiment, the terminal device is able to know the communication quality of the other base stations, which are candidates of the handover destination, and thus the process for causing a handover to be performed to the other base station having a sufficient communication quality can be executed.

The disclosure is not limited to the embodiments described above, and various modifications and changes can be made within the scope of the present disclosure.

The invention claimed is:

1. A base station comprising:
a memory storing instructions that when executed by a processor causes the processor to:
acquire first information indicating one or more other base stations, which are candidates for a handover destination of a terminal device currently in connection with the base station;
acquire second information regarding communication quality predicted in a communication through a candidate base station for each of the candidate base stations based on the first information, wherein the communication quality includes a communication delay; and
notify the terminal device of third information regarding the communication quality including a predicted value of the communication delay for at least one of the candidate base stations based on the second information; wherein the third information regarding the communication quality including the predicted value of the communication delay is used to determine a target base station from the at least one of the candidate base stations for a handover of the terminal device to the target base station, wherein the predicted value of the communication delay of the target base station does not exceed a predetermined value.

2. The base station according to claim 1, wherein the terminal device is notified of the third information by medium access control (MAC) signaling or radio resource control (RRC) signaling.

3. The base station according to claim 1, wherein the first information comprises a measurement report of a radio quality by the terminal device.

4. The base station according to claim 1, wherein the second information is acquired from the one or more candidate base stations through an X2 interface or an S1 interface.

5. The base station according to claim 1, wherein the second information regarding communication quality comprises a measured communication quality in a communication performed in the past in each of the one or more candidate base stations.

6. The base station according to claim 1, wherein the second information regarding communication quality comprises a measured communication quality in at least a portion of a communication path of a communication between the terminal device and a communication opposing device of the terminal device.

7. The base station according to claim 1, wherein the third information indicates a degree at which the communication quality is suited to a predetermined function of the terminal device.

8. The base station according to claim 1, wherein the processor, operatively coupled to the memory, is configured to: notify the terminal device of the third information if the terminal device is a predetermined type of terminal device.

9. The base station according to claim 1, wherein the processor, operatively coupled to the memory, is configured to: determine whether the terminal device is executing a predetermined operation, and wherein the terminal device is notified of the third information when the terminal device is executing the predetermined operation.

10. The base station according to claim 1, wherein the processor, operatively coupled to the memory, is configured to: notify the terminal device of the third information of a mode corresponding to a predetermined type of the terminal device or a predetermined operation being executed by the terminal device.

11. A terminal device comprising:
a communication circuit; and
a memory storing instructions when executed by a processor causes the processor to:
acquire from a first base station connected for communication through the communication circuit, for at least one of one or more other base stations, which are candidates for a handover destination of the terminal device, information regarding communication quality predicted in a communication through the one or more candidate base stations, wherein the communication quality includes a communication delay;

determine a target base station from the one or more other base stations based on the information regarding the communication quality including a predicted value of the communication delay, wherein the predicted value of communication delay of the target base station does not exceed a predetermined value; and notify the first base station of information for executing a handover of the terminal device to the target base station based on the information regarding the communication quality including the predicted value of the communication delay of the target base station.

12. The terminal device according to claim 11, wherein the information regarding communication quality from the first base station is acquired by medium access control (MAC) signaling or radio resource control (RRC) signaling.

13. The terminal device according to claim 11, wherein the processor, operatively coupled to the memory, is configured to: measure radio quality of radio signals transmitted to the terminal device from each of the candidate base stations, and transmit a measurement report to the first base station to trigger a handover of the terminal device to one of the candidate base stations.

14. The terminal device according to claim 11, wherein the information regarding communication quality comprises an actually measured communication quality in a communication performed in the past in each of the one or more candidate base stations.

15. The terminal device according to claim 11, wherein the information regarding communication quality comprises information indicating a degree at which the communication quality is suited to a predetermined function of the terminal device.

16. The terminal device according to claim 11, wherein the information regarding communication quality is information of a mode corresponding to a type of the terminal device or an operation being executed by the terminal device.

17. The terminal device according to claim 11, wherein the information regarding communication quality comprises a measured communication quality in at least a portion of a communication path of a communication between the terminal device and a communication opposing device of the terminal device.

18. The terminal device according to claim 11, wherein the memory storing instructions when executed by the processor causes the processor to: acquire the information regarding communication quality from the base station if the terminal device is a predetermined type of terminal device.

19. The terminal device according to claim 11, wherein the memory storing instructions when executed by the processor causes the processor to: acquire the information regarding communication quality from the base station while the terminal device is performing a predetermined operation.

20. The terminal device according to claim 19, wherein the memory storing instructions when executed by the processor causes the processor to: notify the base station of information on the terminal device.

21. A computer-implemented handover method executed by a first base station, the method comprising:

acquiring first information indicating one or more other base stations, which are candidates for a handover destination of a terminal device currently connected to the first base station;

acquiring second information regarding a communication quality predicted in a communication through a candidate base station for each of the one or more candidate base stations based on the first information, wherein the communication quality includes a communication delay; and notifying the terminal device of third information regarding a predicted value of the communication delay for at least one of the one or more candidate base stations based on the second information, wherein the third information regarding the predictive value of the communication delay is used to determine a target base station from the at least one of the one or more candidate base stations for a handover of the terminal device to the target base station, wherein the predicted value of the communication delay of the target base station does not exceed a predetermined value.

22. A computer-implemented handover method executed by a terminal device, the method comprising:

acquiring, from a first base station currently connected to the terminal device, for at least one of one or more other base stations, which are candidates for a handover destination of the terminal device, information regarding communication quality predicted in a communication through the one or more candidate base stations, wherein the communication quality includes a communication delay;

determining a target base station from the one or more other base stations based on the information regarding a predicted value of the communication delay, wherein the predicted value of communication delay of the target base station does not exceed a predetermined value; and notifying the first base station of information for executing a handover of the terminal device to the target base station based on the information regarding the predicted value of the communication delay of the target base station.

* * * * *